April 16, 1968  K. W. TODD  3,377,864
INSTRUMENTS FOR ASCERTAINING STATIC-PRESSURES
Filed Oct. 25, 1965

INVENTOR
KEITH WATSON TODD

BY Larson and Taylor
ATTORNEYS

United States Patent Office 3,377,864
Patented Apr. 16, 1968

3,377,864
INSTRUMENTS FOR ASCERTAINING
STATIC-PRESSURES
Keith Watson Todd, Hale Barns, England, assignor to Associated Electrical Industries Limited, London, England, a British company
Filed Oct. 25, 1965, Ser. No. 505,154
Claims priority, application Great Britain, Nov. 17, 1964, 46,804/64
11 Claims. (Cl. 73—392)

ABSTRACT OF THE DISCLOSURE

An instrument for measuring the static pressure of a flowing fluid, for example wet stream, comprises a shell having apertures through which the fluid can pass into and out of the shell. The interior of the shell is filled with a porous mass comprising, for example, a multiplicity of steel balls so that static pressure is transmitted to the central region of the shell but kinetically induced pressures tend to be dissipated. An indication of this static pressure can be transmitted out of the shell by an electromechanical transducer in this central region or by a tube connecting this central region to a suitable pressure measuring device.

---

This invention relates to instruments suitable for ascertaining the static-pressure of flowing fluids and has an important application to instruments for ascertaining and measuring the static-pressure of wet steam flowing in the exhaust path of steam turbines.

The static-pressure of a flowing fluid can be measured by means of a static-pressure tube comprising a tube having restricting orifice towards one end, with the plane of the orifice disposed normal to the longitudinal axis of the tube. The tube is set in the gas stream with its longitudinal axis normal to the direction of gas flow, and the pressure of the gas within the tube can then be measured to give the static-pressure of the fluid. This arrangement has the disadvantage that the tube must be set in the gas stream with a high degree of accuracy otherwise errors will occur in the measurements obtained. Moreover, even when accurately set the arrangement will be affected by changes in the direction of gas flow, so that any eddies or turbulence in the gas flow can lead to inaccurate measurements.

An object of the invention is to provide an improved static-pressure measuring instrument suitable for ascertaining the static-pressure of flowing fluids.

According to the present invention an instrument suitable for ascertaining the static-pressure of a flowing fluid comprises a shell having apertures distributed over substantially the whole of its surface arranged so that the fluid can pass freely into or out of the shell, means by which an indication of the fluid pressure in a central region of the shell can be transmitted out of the shell, and a porous mass arranged inside the shell and enclosing the central region, whereby the static-pressure is transmitted to the central region but kinetically induced pressures tend to be dissipated. Preferably the shell is spherical, and the porous mass is a collection of discrete bodies, such as spherical members.

The means for conveying an indication of the fluid pressure can be simply a tube connecting the centre of the shell to a suitable pressure measuring device or can be an electromechanical transducer suitable for transmitting to electrical circuit means electrical signals indicative of the fluid pressure at the centre of the shell.

Figure 1:
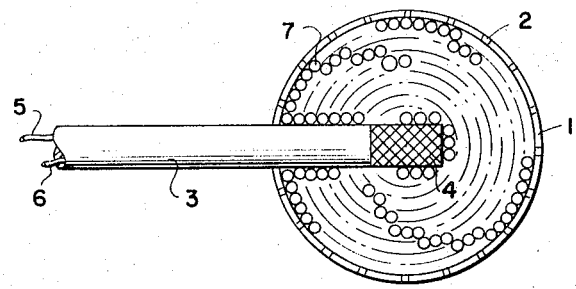
Figure 2:
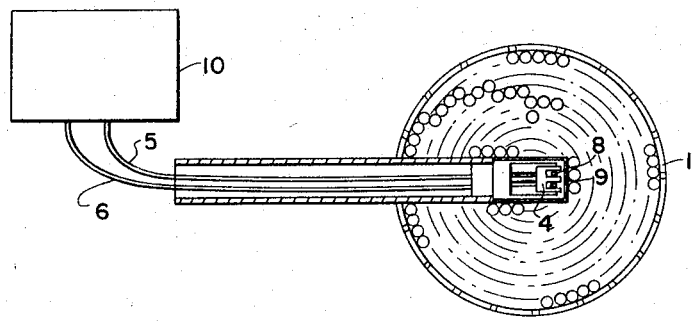
Figure 3:
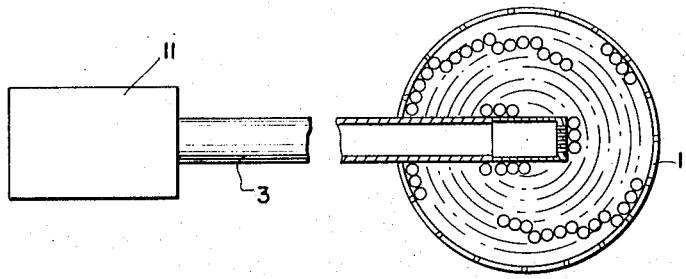

The invention will now be described, by way of example, with reference to the accompanying drawings in which:

FIGURE 1 is a sectional elevation of one form of static-pressure measuring instrument in accordance with the invention; and FIGURES 2 and 3 are sectional elevations of two further forms of static-pressure measuring instrument in accordance with the invention.

Referring first to FIGURE 1, the static-pressure measuring instrument comprises a hollow spherical shell 1 of stainless steel having a multiplicity of circular apertures 2 evenly spaced over substantially the whole of its surface so that a flowing fluid, the static-pressure of which is to be ascertained, can pass into and out of the sphere in any direction. A tube 3 extends into the interior of the shell 1 and supports in a central region of the shell an electro-mechanical transducer 4, with conductors 5 and 6 which form electrical connections to the transducer passing out of the shell through the tube. The remainder of the space within the shell is filled by a multiplicity of spherical members 7 in the form of steel balls such as are used in ball bearings. As shown in FIGURE 2, the electro-mechanical transducer 4 comprises an electromagnetic coil 8 the inductance of which is arranged to be varied by one or more diaphragms 9 of magnetic material arranged to move in response to changes in the pressure of the fluid at the centre of the shell 1. The variation in the inductance of the coils 8 can be utilised to vary the impedance of an electrical circuit 10 in which it is connected by way of the conductors 5 and 6, and thus give an indication of the static-pressure of the fluid.

In another embodiment of the invention shown in FIGURE 3, the transducer 4 is dispensed with, and that end of the tube 3 which is outside the shell 1 is connected to a suitable pressure measuring device 11 so that the pressure in the central region of the shell can be measured to provide an indication of the static-pressure of the fluid.

By way of example, the spherical shell can have a diameter of 0.5 inch to 2.0 inches in the case when an electro-mechanical transducer is contained therein and can have a diameter as small as 0.25 inch when it does not contain a transducer.

An advantage of an instrument in accordance with the invention is that it can be designed to be substantially unaffected by the direction of fluid flow so that accurate setting in the fluid stream is not required.

Since the instrument is quite small, several or many such instruments can be mounted at appropriate locations in a steam turbine so that tests of the operating conditions in the turbine can readily be carried during service.

What I claim is:

1. An instrument suitable for ascertaining the static-pressure of a flowing fluid comprising:
   (a) a sheel having apertures distributed over substantially the whole of its surface arranged so that the fluid can pass freely into and out of the shell;
   (b) means by which an indication of the fluid pressure in a central region of the shell can be transmitted out of the shell; and
   (c) a porous mass comprising a collection of discrete bodies arranged inside the shell and enclosing the central region;
whereby the static pressure is transmitted to the central region but kinetically induced pressures tend to be dissipated.

2. An instrument as claimed in claim 1, wherein the discrete bodies are spherical members.

3. An instrument as claimed in claim 2, wherein the spherical members are of steel.

4. An instrument as claimed in claim 1, wherein the means by which an indication of fluid pressure can be transmitted out of the shell comprises a tube connecting the central region of the shell to a suitable pressure measuring device.

5. An instrument as claimed in claim 1, wherein the means by which an indication of fluid pressure can be transmitted out of the shell is an electromechanical transducer suitable for transmitting to electrical circuit means electrical signals indicative of the fluid pressure at the central region of the shell.

6. An instrument as claimed in claim 5, wherein the electromechanical transducer comprises an electromagnetic coil the inductance of which is arranged to be varied by at least one diaphragm of magnetic material arranged to move in response to changes in the static pressure of the fluid.

7. An instrument as claimed in claim 1, wherein the shell is spherical.

8. An instrument as claimed in claim 1, wherein the shell has a diameter of 0.25 to 2.0 inches.

9. An instrument as claimed in claim 1, wherein the apertures are circular.

10. An instrument as claimed in claim 1, wherein the shell is of stainless steel.

11. An instrument suitable for ascertaining the static-pressure of a flowing fluid comprising:

(a) a stainless steel shell having circular apertures distributed over substantially the whole of its surface and arranged so that the fluid can pass freely into and out of the shell;
(b) means by which an indication of the fluid pressure in a central region of the shell can be transmitted out of the shell; and
(c) a collection of discrete spherical members forming a porous mass arranged inside the shell and enclosing the central region;

whereby the static pressure is transmitted to the central region but kinetically induced pressures tend to be dissipated.

References Cited

UNITED STATES PATENTS

| 3,034,353 | 5/1962 | Anderson | 73—212 |
| 3,098,389 | 7/1963 | Melchior | 73—17 X |

LOUIS R. PRINCE, *Primary Examiner.*

D. O. WOODIEL, *Assistant Examiner.*